United States Patent [19]

Bayard

[11] Patent Number: 5,557,511
[45] Date of Patent: Sep. 17, 1996

[54] EXTENDED HORIZON LIFTINGS FOR PERIODIC GAIN ADJUSTMENTS IN CONTROL SYSTEMS, AND FOR EQUALIZATION OF COMMUNICATION CHANNELS

[75] Inventor: David S. Bayard, Glendale, Calif.

[73] Assignee: The United States of America as represented by the Administrator of the National Aeronautics and Space Administration, Washington, D.C.

[21] Appl. No.: 222,762

[22] Filed: Mar. 16, 1994

[51] Int. Cl.$^6$ .......................... G05B 13/02; G06F 19/00
[52] U.S. Cl. ............................ 364/157; 364/176
[58] Field of Search .................. 364/157, 148, 364/164, 165, 152–156, 176, 177; 375/11–16; 370/32.1, 100.1, 95.3, 95.1, 95.2

[56] References Cited

U.S. PATENT DOCUMENTS

| | | | |
|---|---|---|---|
| 4,949,236 | 8/1990 | Yeh et al. | 364/157 X |
| 5,216,589 | 6/1993 | Shinnara | 364/157 X |
| 5,283,729 | 2/1994 | Lloyd | 364/157 |

OTHER PUBLICATIONS

David S. Bayard, "Globally stable adaptive periodic control," Jet Propulsion Laboratory, Internal Document JPL D–9448, Feb. 3, 1992.

David S. Bayard, "Zero annihilation methods for direct adaptive control of nonminimum–phase systems," Proc. Seventh Yale Workshop on Adaptive and Learning Systems, Yale University, May 1992.

R. Lozano–Leal, "Robust Adaptive Regulation Without Persistent Excitation," IEEE Trans. Automaticontrol, vol. 34, pp. 1260–1267, Dec. 1989.

R. Lozano, J-M. Dion and L. Dugard, "Singularly–Free Adaptive Pole Placement Using Periodi Controllers," IEEE Trans.utomatic Control, vol. 38, pp. 104–108, Jan. 1993.

P. Albertos, "Block Multirate Input–Output Model for Sampled–Data Control Systems," IEEE Trans. Automatic Control, vol. 35, No. 9, pp. 1085–1088, Sep. 1990.

D. S. Bayard and D. Boussalis, "Noncolocated Structural Vibration Suppression Using Zero Annihilation Periodic Control," 2nd IEEE Conf. on Control Applications, Vancouver, Canada, Sep. 13–16, 1993.

A. Das, et al., "ASTREX—A Unique Test Bed for CSI Research," Proc. 29th IEEE Conference on Decision and Control, Honolulu, Hawaii, pp. 2018–2023, Dec. 1990.

Primary Examiner—Joseph Ruggiero
Attorney, Agent, or Firm—John H. Kusmiss

[57] ABSTRACT

Periodic gain adjustment in plants of irreducible order, n, or for equalization of communications channels is effected in such a way that the plant (system) appears to be minimum phase by choosing a horizon time N>n of liftings in periodic input and output windows $\rho_u$ and $\rho_y$, respectively, where N is an integer chosen to define the extent (length) of each of the windows $\rho_u$ and $\rho_y$, and n is the order of an irreducible input/output plant. The plant may be an electrical, mechanical or chemical system, in which case output tracking (OT) is carried out for feedback control or a communication channel, in which case input tracking (IT) is carried out. Conditions for OT are distinct from IT in terms of zero annihilation, namely $H_s H^+_{s}=I$ for OT and $H_s^+ H_s=I$ of IT, where the OT conditions are intended for gain adjustments in the control system, and IT conditions are intended for equalization for communication channels.

6 Claims, 6 Drawing Sheets

EXTENDED HORIZON LIFTINGS FOR PERIODIC GAIN ADJUSTMENTS IN CONTROL SYSTEMS, AND FOR EQUALIZATION OF COMMUNICATION CHANNELS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to providing periodic gain adjustment in control design as a way of modulating control energy to higher frequencies and making the harmonics add in such a way that a nonminimum-phase system appears to be minimum phase using a technique based on the notion of a mathematical "lifting" in which a serial-to-parallel conversion is performed on the control input and output signals, and mappings are considered between the vectorized quantities. This lifting technique is also applicable in communications for equalization of a nonminimum phase channel.

BACKGROUND OF THE INVENTION

In the prior art, nonminimum-phase systems could only be controlled by using low bandwidth, sluggish controllers. In layman's terms, nonminimum-phase systems move in a direction initially opposite to the direction they are pushed. Such systems arise when, for example, one attempts to dampen vibrations on a flexible structure in optical instruments by acting at a location remote from the flexible structure in the case of a "noncolocated" control system.

Nonminimum-phase systems arise in many aerospace applications of noncolocated control, such as spacecraft slewing, instrument pointing/tracking, flexible robotics, acoustic systems, chemical process control systems, compact disk controllers, floppy disk controllers and even real-time equalization of nonminimum-phase communication systems. An object of this invention is to achieve high performance control for the class of nonminimum-phase systems that encompasses these and other applications which are referred to generically as "plants."

A Zero Annihilation Periodic (ZAP) control law was introduced by the present inventor, David S. Bayard, in publications titled "Globally stable adaptive periodic control," Jet Propulsion Laboratory, Internal Document JPL D-9448, February 3, 1992 and "Zero annihilation methods for direct adaptive control of nonminimum-phase systems," Proc. Seventh Yale Workshop on Adaptive and Learning Systems, Yale University, May 1992, for controlling non-minimum-phase systems using stable inversion of the plant. The general ZAP approach is based on the notion of a mathematical "lifting" performed on the plant input and output signals with mapping between the vectorized input and output quantities.

A key property of the ZAP liftings which makes them so useful is that the transmission zeros of the lifted and vectorized plant input signal are annihilated (i.e., placed to the origin). This zero-annihilation (ZA) property allows the vectorized plant signals to be stably inverted using standard control methods. The result is important to many areas of control, communications, and signal processing where a stable plant inverse is often desired but not possible due to nonminimum-phase restrictions.

In a paper by R. Lozano-Leal, "Robust adaptive regulation without persistent excitation," IEEE Trans. Automatic Control, Vol. 34, pp. 1260–1267, December 1989, a multirate sampling method is presented which allows stable inversion of any linear time-invariant finite-order plant signal. Not surprisingly Lozano's lifting has also been applied to developing stable adaptive control algorithms for nonminimum phase systems. See also R. Lozano et al., "Singularly-free adaptive pole placement using periodic controllers," IEEE Trans. Automatic Control, Vol. 38, pp. 104–108, January 1993.

Lifting in this invention is an extension of the prior art represented by Bayard, supra, and Lozano-Leal, supra, to "extended horizons," i.e., to extended periodic windows over which liftings (samples) are taken in adaptive controllers of the type described by Lozano et al., supra, for example. Extended horizon liftings are crucial for control gain reduction in order to allow practical implementations of control in nonminimum-phase systems. The distinction between extended horizon liftings of the present invention and the prior art will now be described.

Since Lozano-Leal's liftings are distinct from the present invention in that it utilizes a horizon size of $N=2n$, where n is the plant order and N is the length of the window for the liftings, and the number of elements in the system input equals those in the system output (i.e., $\sigma_u = \sigma_y$), it will be denoted as the "2n-lifting," while in the present invention $N > n$ and preferably $N \geq 2n-1$ in a large class of systems in which $\sigma_u > \sigma_y$ for output tracking (mapping), such as in feedback control systems, and $\sigma_u < \sigma_y$ for input tracking, such as in communications systems, and which enjoy the same zero annihilation properties as $N=2n$. Unlike the special case of Lozano-Leal's and other prior art liftings, the present invention allows the use of all extended horizon liftings with N greater than n and preferably equal to or greater than $2n-1$ with $\sigma_u > \sigma_y$ or output tracking (OT) and $\sigma_u < \sigma_y$ for input tracking (IT). An important consequence is that such extended horizon liftings lead to plant-inverse controllers with significantly reduced control gains. This overcomes a problem associated with Lozano-Leal's lifting, where $N=2n$ and $\sigma_u = \sigma_y$, which has prevented its use in many applications of practical interest that the present invention will reach. To illustrate the present invention, a simulation example is provided below in which the peak control requirement is reduced by four orders of magnitude using extended horizon liftings.

It will also be shown that as a dual result, a related class of extended horizon liftings enables equalization of non-minimum-phase channels in communication systems. This overcomes the standard problem of inverting the channel in a stable fashion. In this invention, the extended horizon property allows channel inversion by least squares estimation, which provides smoothing in the case of noise.

As background information, consider a plant input/output model, $$A(z^{-1})y_t = B(z^{-1})u_t \qquad (1)$$

$$A(z^{-1}) = 1 + \sum_{i=1}^{n} a_i z^{-i}; \quad B(z^{-1}) = \sum_{i=1}^{n} b_i z^{-i}$$

where the polynomials A and B are assumed to be relatively prime. It is assumed that $b_1 \neq 0$, so that the polynomial B can be factored uniquely into the form $B(z^{-1}) = z^{-d} b_1 \bar{B}(z^{-1})$ where $\bar{B}(z^{-1})$ is a monic polynomial and $d=1$ is the plant delay. The choice d=1 is for convenience only and is not a fundamental restriction. In the case that d≠1, all subsequent expressions can be appropriately modified without loss of generality.

Choose some horizon time N>n. The system of Eq. (1) is iterated to give the following system of linear equations, $$Y(k)=A_1Y(k)+A_2Y(k-1)+B_1U(k)+B_2U(k-1) \quad (2)$$

where, $$Y(k) = \begin{bmatrix} y_{kN+1} \\ y_{kN+2} \\ \cdot \\ \cdot \\ \cdot \\ y_{kN+N} \end{bmatrix} ; \quad U(k) = \begin{bmatrix} u_{kN} \\ u_{kN+1} \\ \cdot \\ \cdot \\ \cdot \\ u_{kN+N-1} \end{bmatrix} \quad (3)$$

Y(k)=plant output
u(k)=plant input
$A_1$=lower triangular Toeplitz, with first column $[O,-a_1,\ldots,-a_n,O,\ldots,O]$
$A_2$=upper triangular Toeplitz, with first row $[O,-a_1,\ldots,-a_n,O,\ldots,O]$
$B_1$=lower triangular Toeplitz, with first column $[b_1,b_2,\ldots,b_n,O,\ldots O]^T$
$B_2$=upper triangular Toeplitz, with first row $[O,\ldots,O,b_n,\ldots,b_2]$ Example 1 Let n=3 and N=4. Then Eq. (2) becomes, $$\begin{bmatrix} y_{4k+1} \\ y_{4k+2} \\ y_{4k+3} \\ y_{4k+4} \end{bmatrix} =$$

$$\begin{bmatrix} 0 & -\alpha_e & -\alpha_2 & -\alpha_1 & | & 0 & 0 & 0 & 0 \\ 0 & 0 & -\alpha_3 & -\alpha_2 & | & -\alpha_1 & 0 & 0 & 0 \\ 0 & 0 & 0 & -\alpha_3 & | & -\alpha_2 & -\alpha_1 & 0 & 0 \\ 0 & 0 & 0 & 0 & | & -\alpha_3 & -\alpha_2 & -\alpha_1 & 0 \end{bmatrix} \begin{bmatrix} y_{4k-3} \\ y_{4k-2} \\ y_{4k-1} \\ y_{4k} \\ \overline{\phantom{y}} \\ y_{4k+1} \\ y_{4k+2} \\ y_{4k+3} \\ y_{4k+4} \end{bmatrix} +$$

$$\begin{bmatrix} 0 & 0 & b_3 & b_2 & | & b_1 & 0 & 0 & 0 \\ 0 & 0 & 0 & b_3 & | & b_2 & b_1 & 0 & 0 \\ 0 & 0 & 0 & 0 & | & b_3 & b_2 & b_1 & 0 \\ 0 & 0 & 0 & 0 & | & 0 & b_3 & b_2 & b_1 \end{bmatrix} \begin{bmatrix} u_{4k-4} \\ u_{4k-3} \\ u_{4k-2} \\ u_{4k-1} \\ \overline{\phantom{u}} \\ u_{4k} \\ u_{4k+1} \\ u_{4k+2} \\ u_{4k+3} \end{bmatrix}$$

It is convenient to combine terms involving Y(k) in eq. (2) and rearrange to give the following lifting of P. Albertos, "Block multirate input-output model for sampled-data control systems," IEEE Trans. Automatic Control, Vol. 35, No. 9, pp. 1085–1088, September 1990.

Albertos' Lifting:

$$Y(k)=AY(k-1)+HU(k)+BU(k-1) \quad (4)$$

where, $$A=(I-A_1)^{-1}A_2 \quad (5a)$$

$$H=(I-A_1)^{-1}B_1 \quad (5b)$$

$$B=(I-A_1)^{-1}B_2 \quad (5c)$$

It is noted that since $A_1$ is lower triangular with zeros on the diagonal, the quantity $(I-A_1)$ is always invertible. Hence the quantities in Eq. (5) always exist.

Polynomial A is divided into B to give impulse response sequence $\{h_i\}$, $$\frac{B(z^{-1})}{A(z^{-1})} = \sum_{i=1}^{\infty} h_i z^{-i} \quad (6)$$

The Markov parameter sequence $\{h_i\}$ is not assumed to be convergent (i.e., the system may be unstable). Using the Toeplitz structure of $A_1$ and $B_1$ and relation, (Eq. (6)), it can be shown that the matrix H in Eqs. (4) and (5) can be written in terms of the impulse response parameters, $$H = \begin{bmatrix} h_1 & 0 & \ldots & & 0 \\ h_2 & h_1 & \cdot & & \cdot \\ \cdot & & \cdot & & \cdot \\ \cdot & & & \cdot & 0 \\ h_N & \ldots & & h_2 & h_1 \end{bmatrix} \quad (7)$$

This is the desired expression for H, i.e., H=lower triangular Toeplitz, with first column $[h_1,h_2,\ldots,h_H]^T$. Since the delay is unity by assumption (i.e., d=1), the matrix H has a nonzero diagonal (i.e., $h_1\neq 0$), and is always invertible.

STATEMENT OF THE INVENTION

In accordance with the present invention, an improved method for providing periodic gain adjustment in plants of irreducible order, such as for control of electrical, mechanical or chemical systems or for equalization of communication channels, comprises the choosing of a horizon time N>n of liftings in periodic input and output signal windows $\rho_u$ and $\rho_y$, respectively, where N is an integer chosen to define the extent (length) of each of the windows $\rho_u$ and $\rho_y$, and n is the order of the irreducible input/output plant model given by an equation of the form $$A(z^{-1})y_t = B(z^{-1})u_t$$

$$A(z^{-1}) = 1 + \sum_{i=1}^{n} a_i z^{-i}; \quad B(z^{-1}) = \sum_{i=1}^{n} b_i z^{-i}$$

where polynomials A and B are relatively prime, such that the horizon time for liftings have a total length N=m+l+p+q+2n−1, and in which the number of elements $\sigma_u$ in the liftings taken from the input signal is greater than the number of elements $\sigma_y$ in the liftings taken from the output signal for output tracking in control systems and vice versa ($\sigma_u<\sigma_y$) for input tracking in communication systems. The extended horizon liftings for output tracking over a selected input signal window $\rho_u$ and a selected output signal window $\rho_y$ are of the form $$\rho_u = [\overbrace{0,\ldots,0}^{m}, \overbrace{1,\ldots,1}^{l}, \overbrace{\rho,}^{p} \overbrace{1,1,\ldots,1}^{n}, \overbrace{0,\ldots,0}^{q}, \overbrace{0,\ldots,0}^{n-1}]$$

$$\rho_y = [\overbrace{0,\ldots,0}^{m}, \overbrace{0,\ldots,0}^{l}, \overbrace{\rho,}^{p} \overbrace{0,\ldots,0}^{q}, \overbrace{0,\ldots,0}^{n-1}, \overbrace{1,1,\ldots,1}^{n}]$$

where m, l, p, n, q, and n−1 are elements of the lifting, and m≧0 and l≧0 are arbitrary, q=0, $\rho \in R^P$ is an arbitrary (or null) 0–1 vector chosen identically in both $\rho_u$ and $\rho_y$, and n>0 is the order of the irreducible plant. If the system is obtained by zero-order hold digitization of a continuous-time plant, the integer q≧0 can be chosen arbitrarily. Since there are m+1 zeros on the left of $\rho_y$ and only m zeros on the left of $\rho_u$, the number of elements $\sigma_u$ is greater than $\sigma_y$ for output tracking. For input tracking, the extended horizon liftings are of the same general form, but now there are m+1 zeros on the left of $\rho_u$, and only m zeros on the left of $\rho_y$ so that the number of elements $\sigma_u$ is less than $\sigma_y$.

DETAILED DESCRIPTION OF THE INVENTION

A class of liftings (N>n) will first be defined by generalizing the lifting of Albertos (Eq. (4)). For this purpose, it will be useful to construct the "small" vector $Y_s(k)$ from $Y(k)$ as follows, $$Y_s(k) \stackrel{\Delta}{=} S_y Y(k) \in R^{\sigma_y}$$

where $S_y \in R^{\sigma_y \times N}$ is a selection matrix which sifts out $\sigma_y$ elements of $Y(k)$ for inclusion into $Y_s(k)$.

The matrix $S_y$ is most conveniently constructed from a 0–1 vector $\rho_y$. For example, if $\rho_y=[1,1,0,0]$ then $Y_s(k) \in R^2$ contains the first two elements of $Y(k) \in R^4$ and the selection matrix is given as, $$S_y = \begin{bmatrix} 1 & 0 & 0 & 0 \\ 0 & 1 & 0 & 0 \end{bmatrix}$$

A systematic method to construct $S_y$ is defined as follows: form a diagonal matrix from the entries of vector $\rho_y$, and then remove all rows made up entirely of 0s. This construction defines the mapping $W:R^N \to R^{\sigma_y \times N}$ for which one can write $S_y=W(\rho_y)$. Since $\rho_y$ can be uniquely reconstructed by a logical "or" over the columns of $S_y$, the mapping W is one-to-one.

Using the above notation, the following "small" vectors are defined, $$Y_s(k) \stackrel{\Delta}{=} S_y Y(k); \quad S_y \stackrel{\Delta}{=} W(\rho_y) \in R^{\sigma_y \times N} \tag{8a}$$

$$U_s(k) \stackrel{\Delta}{=} S_u U(k); \quad S_u \stackrel{\Delta}{=} W(\rho_u) \in R^{\sigma_u \times N} \tag{8b}$$

$$Y_s^c(k) \stackrel{\Delta}{=} S_y^c Y(k); \quad S_y^c \stackrel{\Delta}{=} W(\rho_y^c) \in R^{(N-\sigma_y) \times N} \tag{8c}$$

where $\rho_y$ and $\rho_u$ are specified 0–1 window vectors, and $\rho_y^c$ is defined as the 0–1 complement of $\rho_y$. The vector $Y_s^c(k)$ in Eq. (8c) is denoted as the complementary output since it comprises all elements of the vector $Y(k)$ which are not included in $Y_s(k)$.

A formula to reconstruct $Y(k)$ from $Y_s(k)$ and $Y_s^c(k)$ is now derived. First, it is to be noted that the quantity $\overline{S}_y=[S_y^T, (S_y^c)^T]^T$ is a permutation matrix. Hence its inverse is its transpose, i.e., $\overline{S}_y^T \overline{S}_y=I$, which upon expanding gives $$S_y^T S_y + (S_y^c)^T S_y^c = I \tag{9}$$

Multiplying both sides of Eq. (9) on the right by $Y(k)$ gives the desired formula, $$Y(k)=S_y^T Y_s(k)+(S_y^c)^T Y_s^c(k) \tag{10}$$

Figure 1:
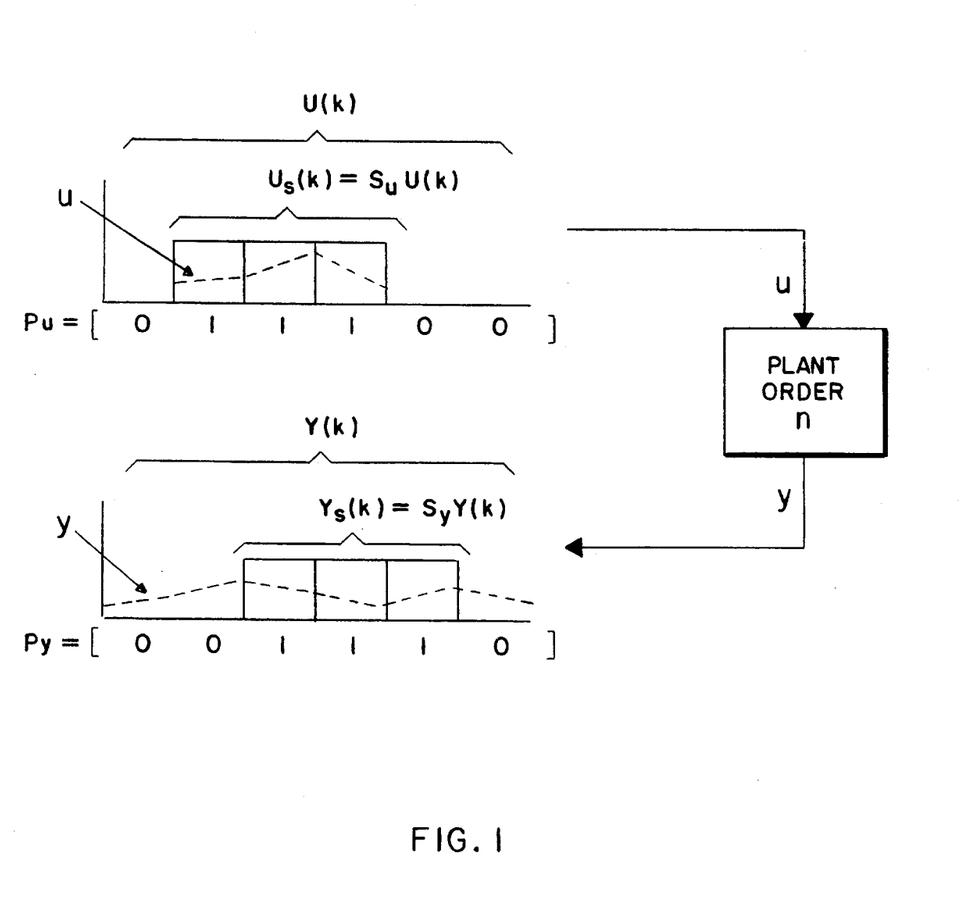
FIG. 1 graphically depicts partial horizon vectors $U_s$ and $Y_s$ using windows $\rho_u$ and $\rho_y$.

Example 2. FIG. 1 graphically depicts partial horizon vectors $U_s$ and $Y_s$ for the limited liftings case of n=3 and N=6, as determined by window vectors $\rho_u=[0,1,1,1,0,0]$ and $\rho_y=[0,0,1,1,1,0]$. In this case, $\rho_y^c=[1,1,0,0,0,1]$ and one can compute, $$S_u = W(\rho_u) = \begin{bmatrix} 0 & 1 & 0 & 0 & 0 & 0 \\ 0 & 0 & 1 & 0 & 0 & 0 \\ 0 & 0 & 0 & 1 & 0 & 0 \end{bmatrix};$$

$$S_y = W(\rho_y) = \begin{bmatrix} 0 & 0 & 1 & 0 & 0 & 0 \\ 0 & 0 & 0 & 1 & 0 & 0 \\ 0 & 0 & 0 & 0 & 1 & 0 \end{bmatrix}$$

$$S_y^c = W(\rho_y^c) = \begin{bmatrix} 1 & 0 & 0 & 0 & 0 & 0 \\ 0 & 1 & 0 & 0 & 0 & 0 \\ 0 & 0 & 0 & 0 & 0 & 1 \end{bmatrix}$$

In the present invention, a new family of extended liftings ($N \leq 2n-1$) will be defined using the notation developed above for Albertos' N-lifting in Eq. (4). As a key step, it will be assumed that $U(k)$ is chosen as zero outside the window defined by $\rho_u$. Mathematically this can be written as, $$(I-S_u^T S_u)U(k)=0 \tag{11}$$

Consider the following nonminimal state-space realization of Albertos' N-lifting Eq. (4) determined by using the small vectors in Eqs. (8) and identity Eq. (11), $$\begin{bmatrix} Y(k) \\ U_s(k) \end{bmatrix} = \begin{bmatrix} A & BS_u^T \\ 0 & 0 \end{bmatrix} \begin{bmatrix} Y(k-1) \\ U_s(k-1) \end{bmatrix} + \begin{bmatrix} HS_u^T \\ I \end{bmatrix} U_s(k) \tag{12}$$

$$Y_s(k) = [S_y \quad 0] \begin{bmatrix} Y(k) \\ U_s(k) \end{bmatrix} \tag{13}$$

Substituting for the state in the output Eq. (13) gives the alternative output equation, $$Y_s(k) = [S_y A \quad S_y B S_u^T] \begin{bmatrix} Y(k-1) \\ U_s(k-1) \end{bmatrix} + S_y H S_u^T U_s(k) \quad (14)$$

For analysis purposes, it is convenient to transform the open-loop plant using the similarity transformation T where, $$\begin{bmatrix} Y_s(k) \\ Y_s^c(k) \\ U_s(k) \end{bmatrix} = T \begin{bmatrix} Y(k) \\ U_s(k) \end{bmatrix} \quad (15)$$

$$T = \begin{bmatrix} C \\ M \end{bmatrix}; C = [S_y \quad 0]; M = \begin{bmatrix} S_y^c & 0 \\ 0 & I \end{bmatrix} \quad (16)$$

$$S_y^c \triangleq W(\rho_y^c) \quad (17)$$

It can be verified that transformation T is square and invertible. Furthermore, T is in the form of a permutation matrix which reorders the state such that the components of $Y_s$ appear first, and the remaining elements follow in the specified order. Since T is a permutation matrix, the inverse of T is given simply by its transpose (cf., Barnett Matrices: Methods and Applications, Clarendon Press, Oxford, England, 1990, pp. 374), i.e., $$T^{-1} = T^T = [C^T, M^T] \quad (18)$$

Transforming the open-loop dynamics of Eq. (12) by the similarity transformation of Eqs. (15) and (16), gives rise to a very useful representation denoted as the Generalized Lifting System Model, Generalized Lifting System Model, $G(\rho_u, \rho_y)$:

$$\begin{bmatrix} Y_s(k) \\ Y_s^c(k) \\ U_s(k) \end{bmatrix} = \begin{bmatrix} S_y A S_y^T & S_y A (S_y^c)^T & S_y B S_u^T \\ S_y^c A S_y^T & S_y^c A (S_y^c)^T & S_y^c B S_u^T \\ 0 & 0 & 0 \end{bmatrix} \begin{bmatrix} Y_s(k-1) \\ Y_s^c(k-1) \\ U_s(k-1) \end{bmatrix} + \begin{bmatrix} S_y H S_u^T \\ S_y^c H S_u^T \\ I \end{bmatrix} U_s(k) \quad (19)$$

Figure 2:
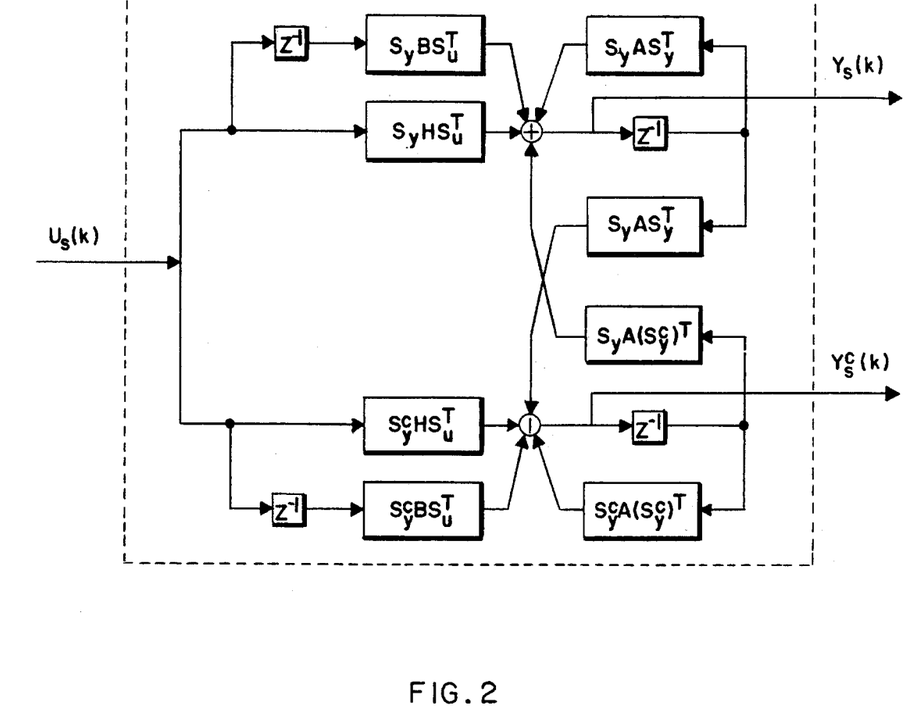
FIG. 2 is a block diagram of a generalized lifting system model $G(\rho_u,\rho_y)$ defined by Equation 19 applicable to control systems in general.

It is noted that the generalized lifting $G(\rho_u, \rho_y)$ of horizon length N<n is defined uniquely by the choice of selection windows $\rho_u$ and $\rho_y$, from which the matrices $S_u, S_y, S_y^c$ are calculated. The generalized lifting system model of Eq. (19) is depicted in the block diagram of FIG. 2. It is seen that $Y_s$ and $Y_s^c$ form two coupled subsystems which are driven by a common input $U_s$. It is also noted that the transmission zeros of the transfer function from $U_s(k)$ to $Y_s(k)$ are affected by the choice of windows $\rho_u$ and $\rho_y$. This is a key feature which will be used to advantage in applications of the present invention.

The lifting $G(\rho_u, \rho_y)$ generalizes a number of existing results. For example, Albertos' lifting in Eq. (4), taken from the paper of Albertos, supra, is equivalent to a choice of periodic windows (horizon length N) as shown in Eq. (20) for input and output liftings without regard to the plant order which should a priori be excluded for consideration in applications of the present invention.

$$\rho_u = [\overbrace{1,1,\ldots,1,1}^{N}] \quad (20)$$

$$\rho_y = [\overbrace{1,1,\ldots,1,1}^{N}]$$

The 2n-lifting of Lozano-Leal, supra, is equivalent to the specific choice of periodic windows of horizon length N=2n as shown in Eq. (21), which is a special case also to be excluded from the present invention.

$$\rho_u = [\overbrace{\overbrace{0,1,1,\ldots,1}^{n}, \overbrace{0,\ldots,0}^{n-1}}^{N}] \quad (21)$$

$$\rho_y = [\overbrace{0,0,\ldots,0}^{n-1}, \overbrace{1,1,\ldots,1}^{n}]$$

Since each choice of $\rho_u$ and $\rho_y$ gives rise to a unique lifting, there are a total of $2^{N+1}$ possible generalized liftings over a horizon of length N. Aside from the liftings of Eqs. (20) and (21), it appears that none of the other possible generalized liftings have been investigated in the literature. It will now be shown that many of the other possible generalized liftings have very useful properties, particularly those of N>2n−1.

Zero Annihilation

Focus will now be on those liftings for which the transmission zeros of the (squared down) lifted system lie at the origin. For notational convenience, we define the "small" matrix $H_s$ by, $$H_s = S_y H S_u^T \quad (22)$$

Figure 3:
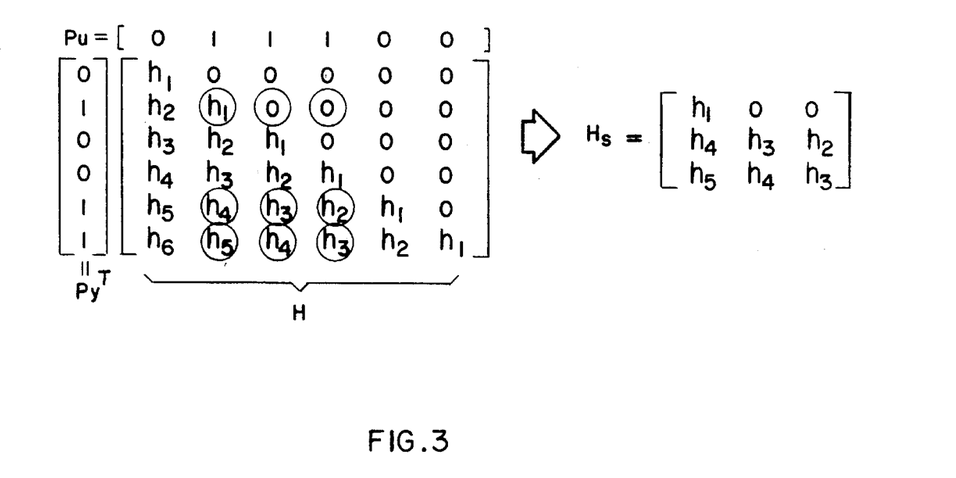
FIG. 3 illustrates graphically the determination of a small matrix $H_s$ from input and output signal liftings in respective windows $\rho_u$ and $\rho_y$.

The quantity $H_s$ appears in many expressions and will play an important role in subsequent proofs. The matrix $H_s$ can be obtained directly from $\rho_u$ and $\rho_y$ by writing $\rho_u$ along the top of H and $\rho_y$ along the side of H. This arrangement is depicted graphically in FIG. 3. The matrix $H_s$ is then the submatrix defined by the elements of H having 1's along both borders. Two properties of interest concerning $H_s$ are, Output Tracking (OT) Condition:

$$H_s H_s^\dagger = I \quad (23)$$

Input Tracking (IT) Condition:

$$H_s^\dagger H_s = I \quad (24)$$

where I is the identity matrix and the superscript † denotes the Moore-Penrose inverse. It is noted that both the OT and IT conditions are satisfied if $H_s$ is square and invertible. The OT condition is intended for gain adjustments in control systems, and the IT condition is intended for equalization of communication channels.

The property of placing transmission zeros of the lifted plant to the origin is characterized in the following:

Lemma 1 (Zero Annihilation) Assume that windows $\rho_u$ and $\rho_y$ satisfy, Zero Annihilation (ZA) Conditions:

$$B S_u^T = 0 \quad (25)$$

$$A(S_y^c)^T = 0 \quad (26)$$

where, $$S_u = W(\rho_u); S_y = W(\rho_y); S_y^c = W(\rho_y^c)$$

Figure 4:
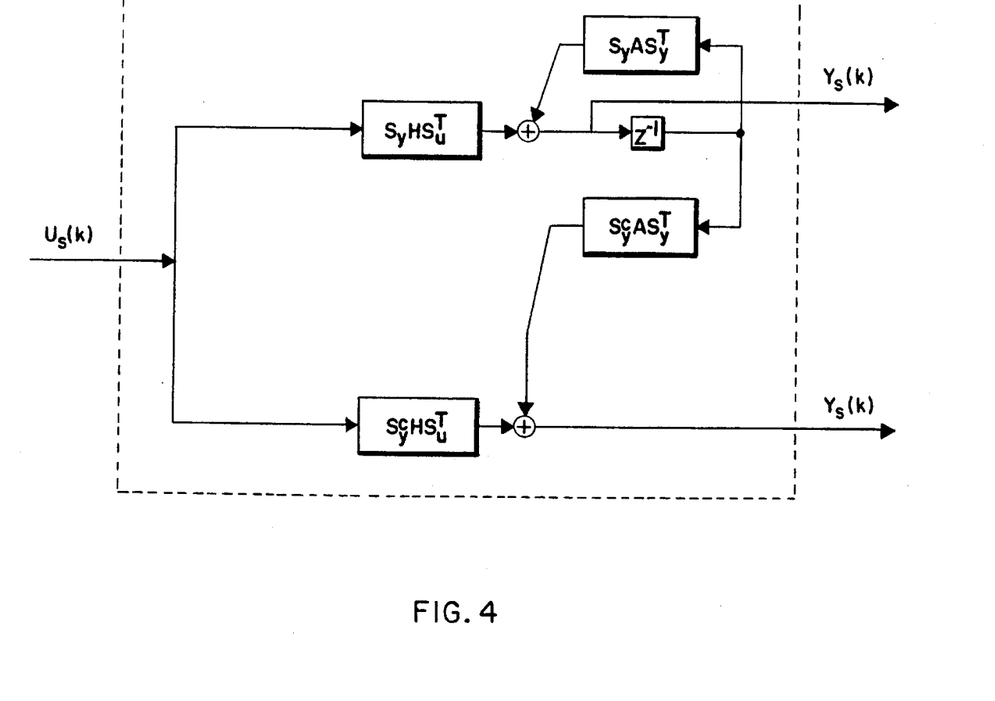
FIG. 4 is a block diagram of a generalized lifting system model under zero annihilation conditions $BS_u^T=0$ and $A(S_y^c)^T=0$ defined by Eqs. (27) and (28).

Then, (i) the generalized lifting of Eq. (19) has a simplified representation, $$Y_s(k) = S_y A S_y^T Y_s(k-1) + H_s U_s(k), \text{ and} \quad (27)$$

$$Y_s^c(k) = S_y^c A S_y^T Y_s(k-1) + S_y^c H S_u^T U_s(k) \quad (28)$$

as illustrated in FIG. 4, and (ii) $Y_s^c$ is unobservable from $Y_s$ and has stable (deadbeat) dynamics.

Furthermore, (iii) if $H_s$ in Eq. (23) is square and invertible, then the transmission zeros of the lifted transfer function in Eq. (19) from $U_s$ to $Y_s$ are annihilated (i.e., lie at the origin), and (iv) if the OT condition Eq. (24) is satisfied then the transmission zeros of the "squared down" lifted transfer function Eq. (19) from V (where $U_s = H_s' V$) to $Y_s$ are annihilated.

Proof: Results (i) and (ii) follow by substituting the ZA conditions Eqs. (25) and (26) into Eq. (19), to give, $$\begin{bmatrix} Y_s(k) \\ Y_s^c(k) \\ U_s(k) \end{bmatrix} = A_p \begin{bmatrix} Y_s(k-1) \\ Y_s^c(k-1) \\ U_s(k-1) \end{bmatrix} + B_p U_s(k) \quad (29)$$

$$Y_s(k) = C_p \begin{bmatrix} Y_s(k-1) \\ Y_s^c(k-1) \\ U_s(k-1) \end{bmatrix} + D_p U_s(k) \quad (30)$$

where, $$A_p = \begin{bmatrix} S_y A S_y^T & 0 & 0 \\ S_y^c A S_y^T & 0 & 0 \\ 0 & 0 & 0 \end{bmatrix}; B_p = \begin{bmatrix} S_y H S_u^T \\ S_y^c H S_u^T \\ I \end{bmatrix} \quad (31)$$

$$C_p = [S_y A S_y^T \quad 0 \quad 0]; D_p = H_s \quad (32)$$

According to standard definitions (cf., E. J. Davison and S. H. Wang, "Properties and calculation of transmission zeros of linear multivariable systems," Automatica, Vol. 10, pp. 643–658, 1974) values of $\lambda$ satisfying, $$\det \begin{bmatrix} A_p - \lambda I & B_p \\ C_p & D_p \end{bmatrix} = 0 \quad (33)$$

are the transmission zeros of the transfer function from $U_s(k)$ to $Y_s(k)$ defined by the state-space model $(A_p, B_p, C_p, D_p)$. Consider the following identity, $$\det(G) = \det(G_{22}) \det(G_{11} - G_{12} G_{22}^{-1} G_{21}) \quad (34)$$

where, $$G \triangleq \begin{bmatrix} G_{11} G_{12} \\ G_{21} G_{22} \end{bmatrix}$$

and the inverse of $G_{22}$ is assumed to exist. Assuming that $H_s$ is invertible, the identity Eq. (34) can be applied to Eq. (33), which gives upon substituting Eqs. (31) and (32), $$\det \begin{bmatrix} -\lambda \cdot I & 0 & 0 \\ X & -\lambda \cdot I & 0 \\ X & 0 & -\lambda \cdot I \end{bmatrix} = (-\lambda)^{N + \sigma_u}$$

which proves (iii). Result (iv) follows by an identical analysis assuming that the OT condition Eq. (23) holds, and that the simplified plant $(A_p, B_p, C_p, D_p)$ in Eqs. (29)–(32) has been squared down by a precompensator $H_s'$.

Lemma 1 is important since it gives conditions which $\rho_u$ and $\rho_y$ must satisfy for the generalized lifting $G(\rho_u, \rho_y)$ to have its transmission zeros at the origin. All results in Lemma 1 can be simply understood by comparing the block diagram of FIG. 3 with FIG. 4 and noting all of the blocks that have vanished under the ZA conditions. It is seen that $Y_s^c$ no longer couples into the $Y_s$ subsystem. Furthermore, the $Y_s^c$ subsystem has become deadbeat i.e., all of the poles of the $Y_s^c$ subsystem are at the origin. Most importantly, there is now only one forward path from $U_s$ to $Y_s$. Clearly something drastic has happened to the system zeros. Rigorously, if $H_s$ is square invertible, result (iii) of Lemma 1 states that the transmission zeros of the transfer function from $U_s(k)$ to $Y_s(k)$ have been placed to the origin (i.e., annihilated). If $H_s$ is not square but the OT condition holds, result (iv) of Lemma 1 states that the zeros the lifted plant "squared down" by a precompensator $H_s'$ are annihilated.

Extended Horizon Liftings

The result of using extended horizons for the liftings introduces a new class of liftings which satisfy the conditions of Lemma 1.

Theorem 1 A class of generalized liftings $G(\rho_u, \rho_y)$ which satisfy both the ZA and OT conditions is of the following form, Extended Horizon Lifting (OT Form):

$$\overbrace{\phantom{XXXXXXXXXXXXXXXXXXXXXXXXXXX}}^{N} \quad (35)$$
$$\rho_u = [\overbrace{0, \ldots, 0}^{m}, \overbrace{1, \ldots, 1}^{l}, \overbrace{\rho}^{p}, \overbrace{1, 1, \ldots, 1}^{n}, \overbrace{0, \ldots, 0}^{q}, \overbrace{0, \ldots, 0}^{n-1}]$$

$$\rho_y = [\overbrace{0, \ldots, 0}^{m}, \overbrace{0, \ldots, 0}^{l}, \overbrace{\rho}^{p}, \overbrace{0, \ldots, 0}^{q}, \overbrace{0, \ldots, 0}^{n-1}, \overbrace{1, 1, \ldots, 1}^{n}] \quad (36)$$

where elements $m \geq 0$ and $l \geq 0$ are arbitrary, $q = 0$, $\rho \in R^p$ is an arbitrary (or null) 0–1 vector chosen identically in both $\rho_u$ and $\rho_y$; and $n > 0$ is the order of the irreducible plant of the form given by Eq. (1). Furthermore, if the plant (system) of Eq. (1) is obtained by a zero-order hold (ZOH) digitization of a continuous-time system, the integer $q \geq 0$ can be chosen arbitrarily.

Proof: By definition, the matrix B in Eq. (5c) has the sparse form $B = [O_b | X_b]$ where $O_b \in R^{N \times N - n + 1}$ is a matrix of all "0" elements, and $X_b \in R^{N \times n - 1}$. By construction of $S_u$ from $\rho_u$ in Eq. (35), the nonzero elements of $S_u$ multiply only elements of $O_b$ in the product $B S_u^T$. Hence $B S_u^T = 0$. Likewise, the matrix A in Eq (5a) has the sparse form $A = [O_a | X_a]$ where $O_a \in R^{N \times N - n}$ is a matrix of all "0" elements, and $X_a \in R^{N \times n}$. By construction of $S_y^c$ from $\rho_y^c$ (i.e., 0–1 complement of $\rho_y$ in Eq. (36)), the nonzero elements of $S_y^c$ multiply only elements of $O_a$ in the product $A(S_y^c)^T$. Hence $A(S_y^c)^T = 0$ and the ZA conditions of Eqs. (25) and (26) are satisfied.

In order to show the OT condition, first consider the case where $q \geq 0$. Then choice of Eqs. (35) and (36) ensures that the small matrix $H_s$ is of the form shown in FIG. 3, $$H_s = \begin{array}{c} p \\ n \end{array} \begin{pmatrix} \overset{l}{X} & | & \overset{p}{\mathfrak{Z}} & \overset{n}{0} \\ X & | & X & \mathcal{H} \end{pmatrix} \quad (37)$$

where $\mathfrak{Z} \in R^{p \times p}$ is lower triangular with a nonzero diagonal (and hence is invertible), and $\mathcal{H} \in R^{n \times n}$ is given by, $$\mathcal{H} = \begin{bmatrix} h_{n+q} & \cdots & h_{1+q} \\ \cdot & & \cdot \\ \cdot & & \cdot \\ \cdot & & \cdot \\ h_{2n+q-1} & \cdots & h_{n+q} \end{bmatrix} \quad (38)$$

Since $\mathfrak{S}$ is full rank, it follows from the special structure of Eq. (37) that $H_s$ is full rank if $\mathcal{H}$ has full rank. To show that $\mathcal{H}$ has full rank, let (A,b,c) be any minimal (i.e., controllable and observable) state-space realization of the transfer function Eq. (1). The Markov parameters $\{h_i\}$ can be written as $h_i = cA^{i-1}b, i=1,\ldots,\infty$. Substituting into Eq. (38) gives, $$\mathcal{H} = \begin{bmatrix} cA^{n+q-1}b & \cdots & cA^q b \\ \cdot & & \cdot \\ \cdot & & \cdot \\ \cdot & & \cdot \\ cA^{2n+q-2}b & \cdots & cA^{n+q-1}b \end{bmatrix} \quad (39)$$

$$\mathcal{H} = OA^q \tilde{CI} \quad (40)$$

where $\tilde{I}$ is a reversed identity (i.e., $I=[e_1,\ldots,e_n]$, $\tilde{I}=[e_n,\ldots,e_1]$), and O and C are observability and controllability matrices of (A,b,c), respectively. Since (A,b,c) is controllable and observable, it follows that O and C are each full rank. The fact the system or plant of Eq. (1) is obtained by a ZOH digitization implies that $A \in R^{n \times n}$ is full rank (i.e., A is a state-transition matrix). These facts together imply that $\mathcal{H}$ in Eq. (37) is full rank and hence $H_s$ is invertible.

If the system of Eq. (1) is not obtained by ZOH digitization, the matrix A may not be full rank. However, the results still hold with the restriction that q=0 since in this case $A^q$ is replaced by identity matrix I in relation Eq. (40), which is always full rank.

Theorem 1 is important because it extends Lozano's 2n-lifting to a much larger class of liftings which enjoy the same zero annihilation properties, and thus provides greater latitude (extra degrees of freedom) in designing control systems. Note that the extended horizon liftings have total horizon length N=m+l+p+q+2n−1, which can be readily chosen longer than Lozano's lifting for which N=2n. Hence the phrase "extended liftings horizon". It will be seen that the extra degrees of freedom provided by N=k+2n−1, where k=m+l+p+q, for example, will overcome several difficulties associated with the 2n-lifting. For convenience, this new class of liftings is referred to herein as having N≧2n−1.

The following result is essentially a "dual" to the previous theorem.

Theorem 2 A class of generalized liftings $G(\rho_u, \rho_y)$ which satisfy both the ZA and IT conditions is of the following form, Extended Horizon Lifting (IT Form):

$$\overbrace{\underbrace{m}\ \underbrace{l}\ \underbrace{p}\ \underbrace{n}\ \underbrace{q}\ \underbrace{n-1}}^{N} \quad (41)$$
$$\rho_u = [0,\ldots,0,\ 0,\ldots,0,\ \rho,\ 1,1,\ldots,1,\ 0,\ldots,0,\ 0,\ldots,0]$$

$$\underbrace{m}\ \underbrace{l}\ \underbrace{p}\ \underbrace{q}\ \underbrace{n-1}\ \underbrace{n} \quad (42)$$
$$\rho_y = [0,\ldots,0,\ 1,\ldots,1,\ \rho,\ 0,\ldots,0,\ 0,\ldots,0,\ 1,1,\ldots,1]$$

where m≧0 and l≧0 are arbitrary, q=0, $\rho \in R^p$ is an arbitrary (or null) 0–1 vector chosen identically in both $\rho_u$ and $\rho_y$; and n>0 is the order of the irreducible plant Eq. (1). Furthermore, if the plant or system Eq. (1) is obtained by a zero-order hold (ZOH) digitization of a continuous-time system, the integer q≧0 can be chosen arbitrarily.

Proof: The ZA conditions follow using the same arguments found in the proof of Theorem 1. Consider the IT condition Eq. (24). Given the lifting Eq. (41), H, has the form, $$H_s = \begin{array}{c} p \\ n \\ l \end{array} \begin{pmatrix} \overbrace{\mathfrak{S}}^{p} & \overbrace{0}^{n} \\ X & \mathcal{H} \\ X & X \end{pmatrix} \quad (43)$$

From the structure of Eq. (43) it follows that $H_s$ has full rank if both $\mathfrak{S}$ and $\mathcal{H}$ have full rank. The remainder of the proof is identical to the proof of Theorem 1.

Note: Properties of Lozano's 2n-lifting (N=2n) follows directly from its interpretation as a special case of the liftings N≧2n−1 in Theorem 1 and Theorem 2.

Corollary 1 Lozano's 2n-lifting Eq.(21) satisfies the ZA, OT and IT conditions.

Proof: The lifting Eq. (21) is equivalent to the special case of the liftings in Theorems 1 and 2 where m=0, l=0, p=1, ρ=[0], q=0.

ADVANTAGES

The advantages of the extended horizon liftings in Eqs. (35) and (36), and in Eqs. (41) and (42) over Lozano's 2n-lifting are as follows:

(i) If one chooses l>0 in Eqs. (35) and (36), there are more control inputs than outputs in the lifted system (i.e., $\sigma_u > \sigma_y$). It is shown below with respect to application to plant inverse control that these extra degrees of freedom can be used to design a controller which minimizes a quadratic control cost while simultaneously satisfying a deadbeat tracking objective. This significantly reduces control gains compared with Lozano's lifting.

(ii) If one chooses l>0 in Eqs. (41) and (42), there are more outputs than inputs in the lifted system (i.e., $\sigma_y > \sigma_u$). It is shown below with respect to channel equalization in applications to communications that these extra degrees of freedom can be used to minimize a quadratic error when estimating the input from measurements of the output. This is significant for reducing noise in problems of nonminimum phase channel equalization. Furthermore, the ρ vector can contain additional message information to increase the channel throughput.

(iii) If one chooses m>0 in Eqs. (35) and (36) or Eq. (37), there is an extra m*T seconds of free time which can be used to perform computations (where T is the sampling interval). Since m can be chosen arbitrarily, the use of extended horizon liftings for either control or equalization applications is not constrained by real-time computer limitations. This is particularly useful for adaptive implementations which involve additional computation.

APPLICATION TO PLANT INVERSE CONTROL

The placement of the transmission zeros to the origin by the class of extended horizon liftings of the form given by Eqs. (35) and (36) allows stable invertibility of the transfer function from $U_s(k)$ to $Y_s(k)$. A control law which will be discussed next deadbeats the response $Y_s(k)$ to follow the desired $Y_d(k)$, subject to the minimization of a quadratic control cost.

To derive the desired controller, define the output error as, $$E(k)=Y_d(k)-Y_s(k) \qquad (44)$$

Substituting Eq. (27) into Eq. (44) gives, $$E(k)=-S_yAS_y^TY_s(k-1)-H_sU_s(k)+Y_d(k) \qquad (45)$$

Consider the problem of forcing the error in Eq. (38) to zero in a single step, while minimizing a quadratic control cost penalty, i.e., $$\min_{U_s(k)} U_s^T(k)U_s(k) \qquad (46)$$

subject to $$E(k)=0. \qquad (47)$$

In light of the output tracking condition of Eq. (23), this minimization problem can be solved uniquely (see D. S. Bayard and D. Boussalis, "Noncolocated structural vibration suppression using Zero Annihilation Periodic control," 2nd IEEE Conference on Control Applications, Vancouver Canada, September 13–16, 1993) to give:

Zero Annihilation Periodic (ZAP) Control Law:

$$U_s^o(k)=H_s^t(-S_yAS_y^TY_s(k-1)+Y_d(k)) \qquad (48)$$

$$=K^oY_s(k-1)+L^oY_d(k) \qquad (49)$$

where the corresponding feedback gains are defined as, $$K^o=-H_s^tS_yAS_y^T \qquad (50)$$

$$L^o=H_s^t \qquad (51)$$

Here the superscript "o" is chosen to emphasize the fact that the control nulls (i.e., deadbeats) the output. Also, in light of the OT condition, $H_s$ has full row rank and one can write $H_s^t=H_s^T(H_sH_s^T)^{-1}$ (cf., Barnett, supra).

Figure 5:
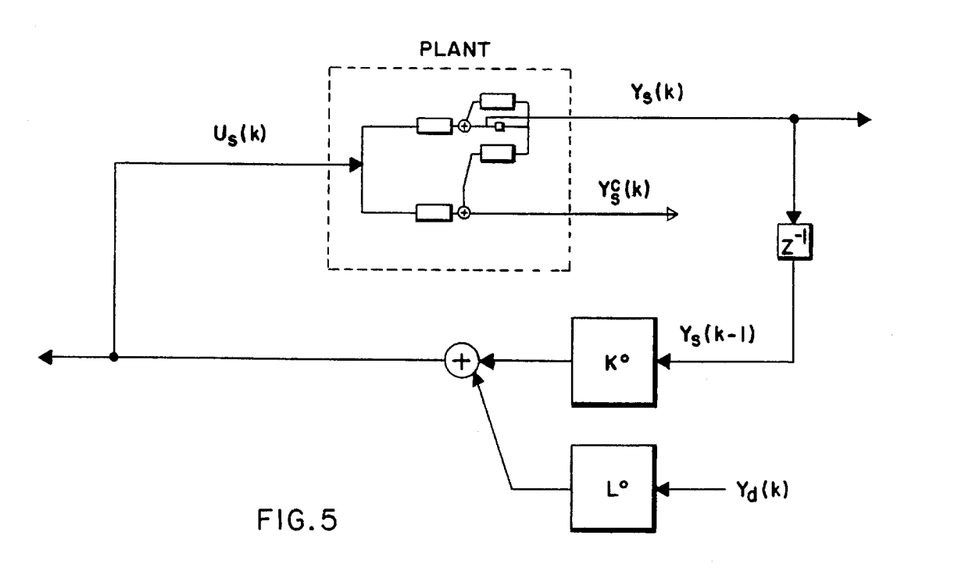
FIG. 5 is a block diagram of a zero annihilation periodic (ZAP) control law having a closed-loop system arising from the output tracking of extended horizon liftings of Equations (35) and (36).

For convenience the ZAP control law is summarized in the block diagram of FIG. 5. It provides the following result.

Lemma 2 (ZAP Control) Consider the closed-loop system arising from the OT extended horizon lifting Eqs. (35) and (36) under ZAP control Eq. (49). Then, (i) The quadratic control cost Eq. (46) is minimized at each stage, subject to the deadbeat tracking constraint Eq. (47), (ii) All closed-loop poles are at the origin (i.e., the closed-loop response is deadbeat), and hence $Y_s(k)$ converges to $Y_d(k)$ in a single step.

(iii) The closed-loop system is internally stable (e.g., $Y_s^c(k)$ remains bounded).

Proof: Result (i) follows from the OT condition in Eq. (23) and well known minimum-norm properties of the Moore-Penrose inverse (cf., Barnett, supra). Now form the closed-loop system from the simplified lifted plant Eqs. (27) and (28) under ZAP control Eq. (49), $$\begin{bmatrix} Y_s(k) \\ Y_s^c(k) \\ U_s(k) \end{bmatrix} = A_{cl} \begin{bmatrix} Y_s(k-1) \\ Y_s^c(k-1) \\ U_s(k-1) \end{bmatrix} + B_{cl}Y_d(k) \qquad (52)$$

where, $$A_{cl} = \begin{bmatrix} (I-H_sH_s^t)S_yAS_y^T & 0 & 0 \\ S_y^c(I-HS_u^TH_s^tS_y)AS_y^T & 0 & 0 \\ -H_s^tS_yAS_y^T & 0 & 0 \end{bmatrix}; \qquad (53)$$

$$B_{cl} = \begin{bmatrix} H_sH_s^t \\ S_y^cHS_u^TH_s^t \\ H_s^t \end{bmatrix}$$

Results (ii) and (iii) follow by substituting the OT condition Eq. (23) into Eq. (53), and noting that the resulting closed-loop matrix is stable with all of its eigen values at the origin.

Result (i) of Lemma 2 is important because it indicates that control gains associated with using extended horizon liftings of the class denoted herein as $N \geq 2n-1$ will be significantly reduced compared to those from using Lozano's lifting (N=2n). Result (iii) of Lemma 2 is important because it ensures that the complementary output $Y_s^c$ remains "well behaved" even though it is not being controlled directly.

Figure 6:
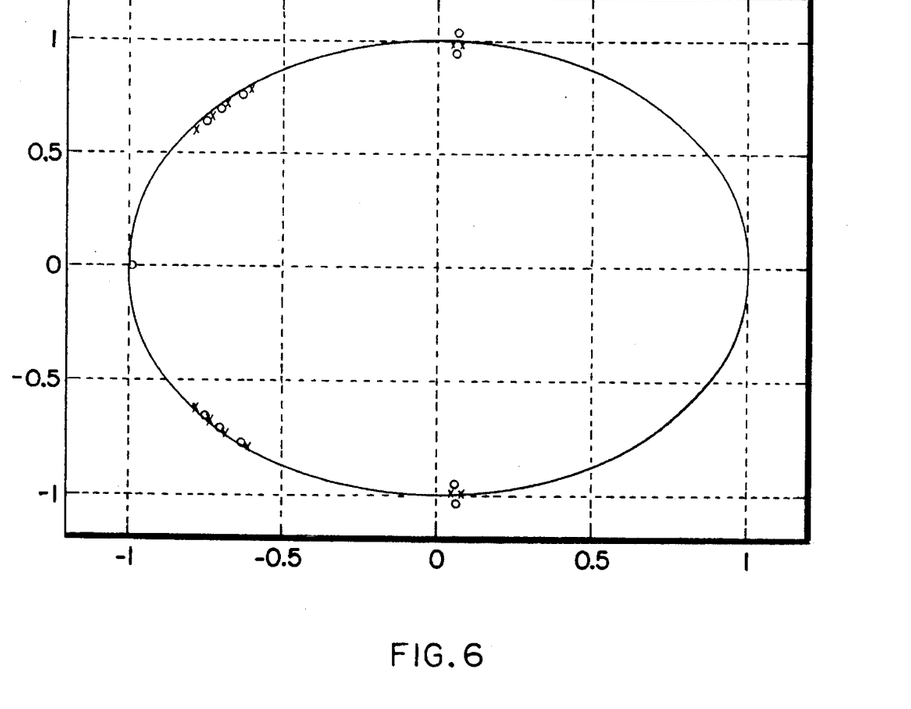
FIG. 6 is a pole-zero plot of a 12-state nonminimum phase plant with a sampling interval T=0.025sec in which poles are represented by "X" and zeros by "0."
Figure 7:
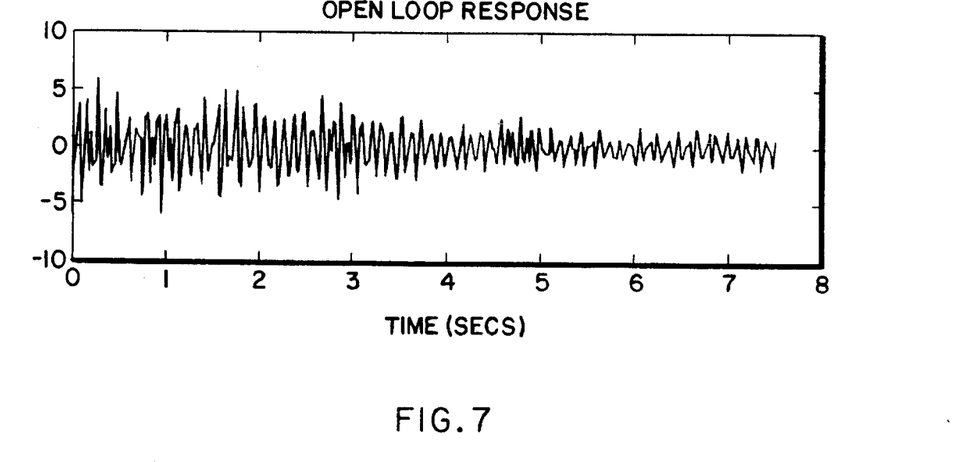
FIG. 7 is a graph of open-loop output response of the plant in FIG. 6 to an initial condition.
Figure 8A:
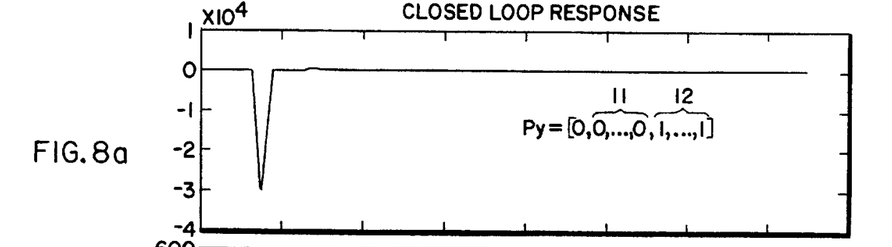
FIGS. 8a and 8b are graphs of respective output and input closed-loop response of the plant in FIG. 6 using deadbeat control with Lozano's 2n-lifting ($\sigma_u=\sigma_y$) with a vibration damping objective.
Figure 8B:
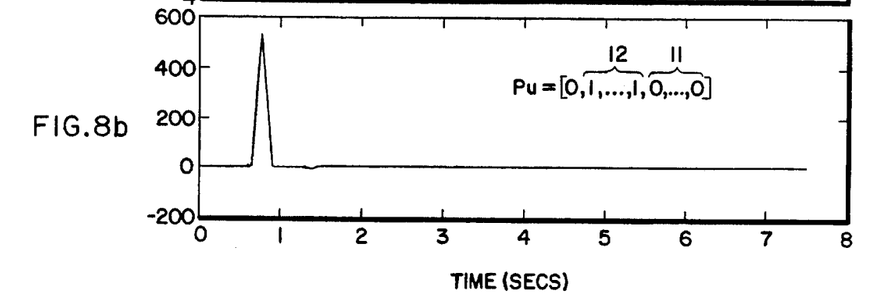

Remark 1 Instead of deadbeat control, a pole placement scheme can be obtained by modifying the deadbeat constraint Eq. (47) to become $E(k)=\alpha E(k-1)$ in which case the ZAP control becomes $U_s^o(k)=K^oY_s(k-1)+L^oY_d(k)-\alpha L^oE(k-1)$ Example 3 As an example, a 12-state nonminimum phase transfer function is shown in FIG. 6 (pole-zero plot, sampling time T=0.025 sec), adopted from the ASTREX flexible structure model(cf. Bayard, 1993, supra and A. Das, J. L. Berg, G. A. Norris, D. F. Cossey, T. J. Strange III, and W. T. Schlaedgel, "ASTREX—A Unique test bed for CSI research," Proc. 29th IEEE Conference on Decision and Control, Honolulu, Hawaii, pp. 2018–2023, December 1990). The open-loop response to an initial condition is shown in FIG. 7. A simulation is first run using the deadbeat control Eq. (49) with the Lozano's 2n-lifting, m=0, l=0, p=1, p=[0], n=12, q=0, N=2n=24, and using $Y_d=0$ (i.e., a vibration damping objective). The response is shown in FIG. 8 to reach $-3 \times 10^4$ at the output and 500 at the input. As expected from the theory, the response is deadbeat after a single horizon. However, this control law is unusable since the units are in volts, and the allowable range is only ±10 Volts. It is emphasized that these extraordinarily large responses are typical of the 2n-lifting due to the fact that the plant is inverted on a horizon of length N.T=0.6 sec.

Figure 9A:
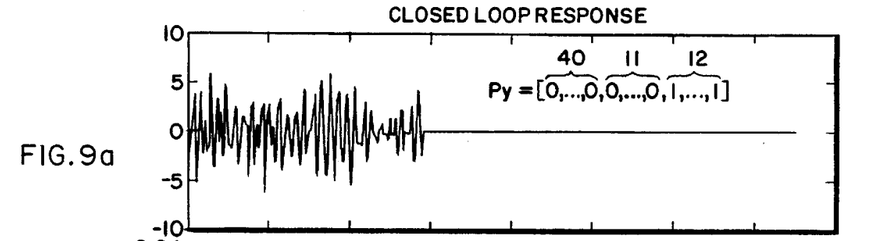
FIGS. 9a and 9b are graphs of respective output and input response using ZAP control of FIG. B with an extended horizon input lifting $\rho_u$ defined by m=0, l=40, p=0, n=12, q=0, N=63. In this case $\sigma_u=52$ and $\sigma_y=12$, so that $\sigma_u>\sigma_y$.
Figure 9B:
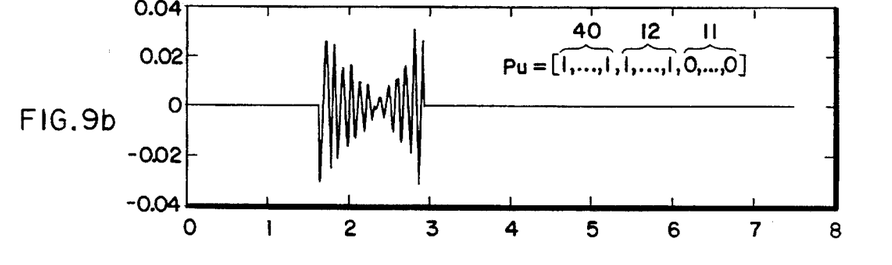

In an attempt to get a practical response with the 2n-lifting, the pole placement control of Remark 1 is used. The choice $\alpha=0.5$ is made to get approximately a 10-second decay time (any slower would be worse than the open-loop response). The results are simulated but not shown here since it turns out that the responses are reduced 50%, and are still unacceptably large by several orders of magnitude. The ZAP control using an extended horizon lifting of the class $N \geq 2n-1$ with m=0, l=40, p=0, q=0, n=12, N=63 was tried next. The results are shown in FIG. 9 where it is seen that both the input and output are well within the allowable ranges. The deadbeat nature of the response is also noted, as the vibrations are damped instantaneously after the first horizon at time T=3sec. This demonstrates the advantage of using the extended horizon liftings of the present invention instead of Lozano's 2n-liftings.

Application to Channel Equalization

An important problem in communications is that of equalizing (i.e., compensating for undesired amplitude-frequency response) a nonminimum phase channel. The usual problem is that the channel cannot be inverted in a stable fashion. However, using the input tracking (IT) extended horizon lifting form of Eqs. (41) and (42), this problem can be overcome.

Figure 10:
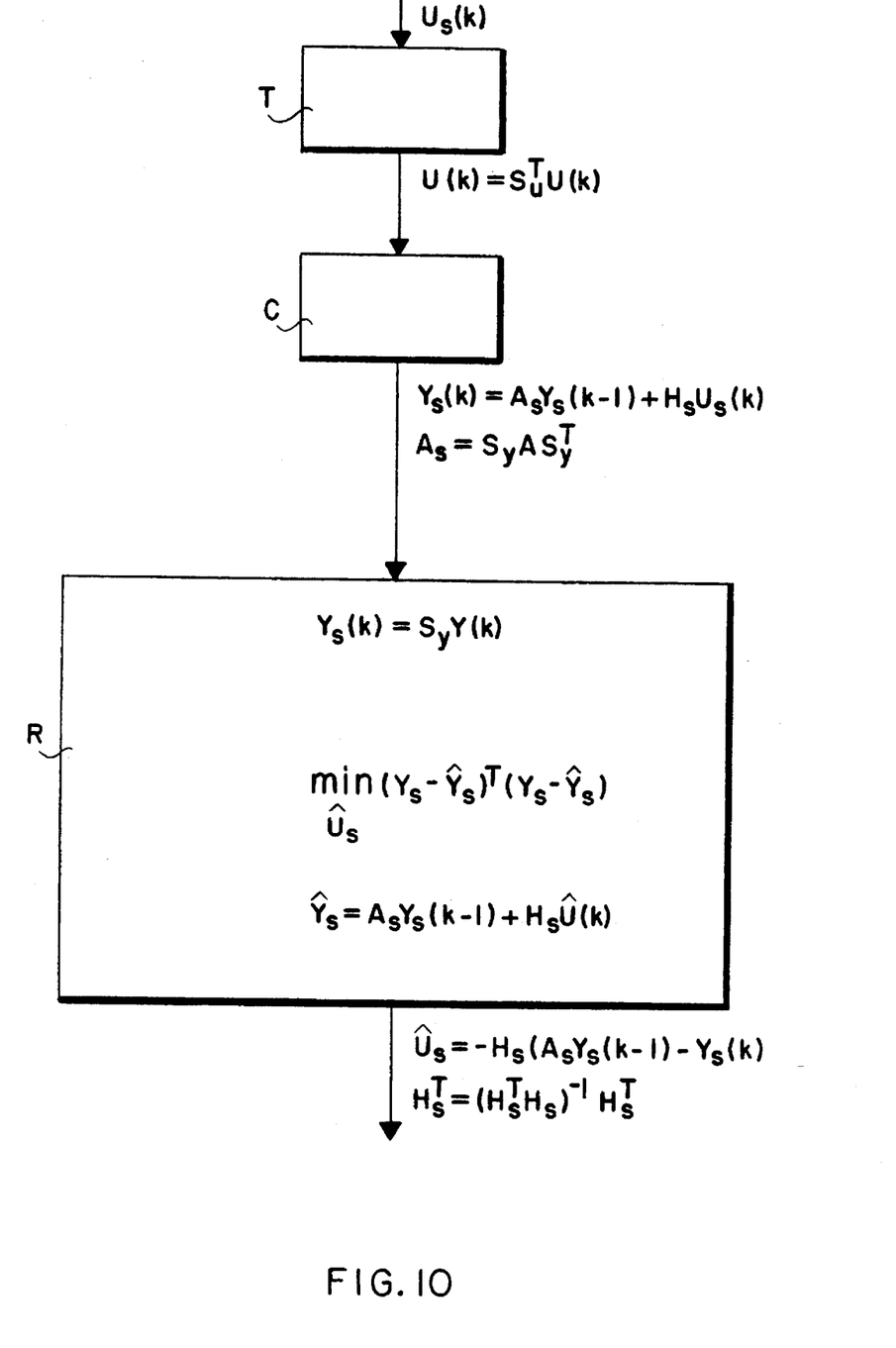
FIG. 10 illustrates application of the present invention to communications for equalizing a nonminimum phase channel.

Referring to FIG. 10, let $U_s(k)$ be the sequence of messages to be sent by a transmitter T, and assume that an IT extended horizon lifting form given by Eqs. (41) and (42) is used to transmit the data (i.e., the signal sent is given by $U(k)=S_u^T U_s(k)$). The channel C is assumed to be a stable linear nonminimum phase transfer function for a plant of the form given by Eq. (1) with a plant order n. Then from Theorem 2 and Lemma 1, the plant (channel) dynamics given by Eqs. (27) and (28) are $$Y_s(k)=A_s Y_s(k-1)+H_s U_s(k) \tag{54}$$

where $$A_s=S_y A S_y^T. \tag{55}$$

At the receiver R, the quantity $Y_s(k)=S_y Y(k)$ is measured, and it is desired to estimate the messages $U_s(k)$ which were sent. For this purpose, an output prediction is $\hat{Y}_s(k)$ is formed as, $$\hat{Y}_s(k)=A_s Y_s(k-1)+H_s \hat{U}_s(k) \tag{56}$$

and an estimate $\hat{U}_s$ found by minimizing the least squares criteria, $$\min_{\hat{U}_s} (Y_s - \hat{Y}_s)^T (Y_s - \hat{Y}_s) \tag{57}$$

Since the IT condition Eq. (24) holds for the extended horizon lifting, the unique solution to Eq. (56) is given by, $$\hat{U}_s=-H_s^t(A_s Y_s(k-1)-Y_s(k)) \tag{58}$$

where one can write $H_s^t=(H_s^T H_s)^{-1} H_s^T$ since $H_s$ has full column rank (cf., Barnett, supra). It is noted that this dynamical system represents a stable inversion of the nonminimum phase channel characteristics. Furthermore, the use of an extended horizon lifting with l>0 has allowed channel inversion by least squares which provides smoothing in case of noise. Lozano's 2n-lifting in this application would not allow smoothing and would be very susceptible to noise. The use of ρ in the IT extended horizon lifting also provides a means for sending additional information with each packet, to improve the overall throughput.

CONCLUSIONS

A general class of liftings N>n has been denominated as N≧2n−1 in order to distinguish from the special case of Lozano (N=2n) and have been shown to have the same desirable zero annihilation properties of Lozano's 2n-lifting. In contrast to Lozano's 2n-lifting, all the new liftings include horizons greater than 2n, i.e., they are of the extended horizon type N>2n−1 and $\sigma_u>\sigma_y$ or $\sigma_y>\sigma_u$. The use of extended horizons of the type N>2n−1 resolves many difficulties associated with Lozano's 2n-lifting. For example, a Zero Annihilation Periodic (ZAP) controller is defined for which the control gains can be significantly reduced as compared to Lozano's lifting. This is due to a quadratic control cost which is minimized simultaneously with the deadbeat tracking objective. The effectiveness was shown in a simulation example where the control torque was reduced 4 orders of magnitude.

As a dual result, it was shown that a related class of liftings enables the on-line equalization of nonminimum phase channels in communication systems. This overcomes the standard bottleneck of inverting the channel in a stable fashion. Here, channel inversion is accomplished by least squares estimation which provides smoothing in the case of noise. It is worth noting that this channel equalization approach can be made adaptive by using standard recursive algorithms since the new liftings are linear-in-the-parameters.

It is expected that the present invention (extended horizon liftings) will be useful in many areas of modern control, neural control, fuzzy control, adaptive control, communications, adaptive filtering, signal processing, or other applications where a stable system inverse is desired but not possible due to nonminimum phase constraints.

I claim:

1. An improved method for providing periodic gain adjustment in a plant of irreducible order, such as for control of electrical, mechanical or chemical systems, or for equalization of communication channels, comprises the choosing of horizon time N>n of liftings in periodic input and output signal windows $\rho_u$ and $\rho_y$, respectively, of said plant where N is an integer chosen to define the extent of each of said windows $\rho_u$ and $\rho_y$ and n is the order of the irreducible input/output plant model given by an equation of the form $$A(z^{-1})y_t = B(z^{-1})u_t$$

$$A(z^{-1}) = 1 + \sum_{i=1}^{n} a_i z^{-i}; B(z^{-1}) = \sum_{i=1}^{n} b_i z^{-i}$$

where polynomials A and B are relatively prime, such that the horizon time for liftings have a total length N=m+l+p+q+2n−1, and in which the number of elements $\sigma_u$ in the liftings taken from the input signal is greater than the number of elements $\sigma_y$ in the liftings taken from the output signal for output tracking in control systems, and in which the number $\sigma_u$ in the liftings taken from the input signal is less than the number of elements $\sigma_y$ taken from the output signals for input tracking in communication systems, and the following conditions hold for output tracking:

where the superscript t denotes the Moore-Penrose inverse of a submatrix $H_s$ obtained directly from $\rho_u$ and $\rho_y$ by placing said vector $\rho_u$ along the top of a matrix H and $\rho_y$ along the side of said matrix H and taking as said submatrix $H_s$ all of the elements of said matrix H along both borders, and $$BS_u^T=0$$

$$A(S_y^c)^T=0$$

where $S_u=W(\rho_u)$; $S_y=W(\rho_y)$; $S_y^c=W(\rho_y^c)$ and said liftings have the following representation $$Y_s(k)=S_y A S_y^T Y_s(k-1)+H_s U_s(k), \text{ and}$$

$$Y_s^c(k)=S_y^c A S_y^T Y_s(k-1)+S_y^c H S_u^T U_s(k)$$

whereby the transmission of zeros of said liftings from $U_s$ to $Y_s$ are annihilated and the transmission of zeros from V, where $H_s=H_s V$, to $Y_s$ are annihilated and $H_s=S_y H S_u^T$, and the following conditions hold for input tracking:

$$H_s^T H_s=I$$

$$BS_u^T=0$$

$$A(S_y^c)^T=0$$

and said liftings have the following representation:

$$Y_s(k)=S_y A S_y^T Y_s(k-1)+S_y^c H S_u^T U_s(k),$$

and controlling the performance of said plant in response to said chosen horizon time.

2. An improved method as defined in claim 1 wherein extended horizon liftings for output tracking over a selected input signal window $\rho_u$ and a selected output signal window $\rho_y$ are of the form $$\rho_u = [\overbrace{\underbrace{0,\ldots,0}_{m},\ \underbrace{1,\ldots,1}_{l},\ \underbrace{\rho}_{p},\ \underbrace{1,1,\ldots,1}_{n},\ \underbrace{0,\ldots,0}_{q},\ \underbrace{0,\ldots,0}_{n-1}}^{N}]$$

$$\rho_y = [\underbrace{0,\ldots,0}_{m},\ \underbrace{0,\ldots,0}_{l},\ \underbrace{\rho}_{p},\ \underbrace{0,\ldots,0}_{q},\ \underbrace{0,\ldots,0}_{n-1},\ \underbrace{1,1,\ldots,1}_{n}]$$

where m, l, p, n, q, and n−1 are elements of the lifting, and m≧0 and l≧0 are arbitrary, $\rho \epsilon R^p$ is an arbitrary or null 0–1 vector chosen identically in both $\rho_u$ and $\rho_y$ and n>0 is the order of the irreducible plant, and q=0, unless the plant liftings are obtained by a zero-order-hold digitization of a continuous-time analog signal, in which case q>0 can be chosen arbitrarily.

3. An improved method as defined in claim 2 wherein output tracking for control is implemented using the following Zero annihilation Periodic control law $$U_s^o(k) = H_s^I(-S_y A S_y^T Y_s(k-1) + Y_d(k))$$

where the feedback gains $K^o$ and $L^o$ are defined as, $$K^o = -H_s^I S_y A S_y^T$$

$$L^o H_s^I$$

where $H_s^I$ is the Moore-Penrose inverse of $H_s$, and $Y_d$ is a desired output signal to be tracked.

4. An improved method as defined in claim 2 wherein control is implemented using a pole placement scheme, $$U_s^o(k) = K^o Y_s(k-1) + L^o Y_d(k) - \alpha L^o E(k-1)$$

where, $$E(k-1) = Y_d(k) - Y_s(k)$$

$$K^o = -H_s^I S_y A S_y^T$$

$$L^o = H_s^I$$

and $\alpha$ is a scalar less than unity.

5. An improved method as defined in claim 1 wherein said extended horizon liftings are of the form, $$\rho_u = [\overbrace{\underbrace{0,\ldots,0}_{m},\ \underbrace{0,\ldots,0}_{l},\ \underbrace{\rho}_{p},\ \underbrace{1,1,\ldots,1}_{n},\ \underbrace{0,\ldots,0}_{q},\ \underbrace{0,\ldots,0}_{n-1}}^{N}]$$

$$\rho_y = [\underbrace{0,\ldots,0}_{m},\ \underbrace{1,\ldots,1}_{l},\ \underbrace{\rho}_{p},\ \underbrace{0,\ldots,0}_{q},\ \underbrace{0,\ldots,0}_{n-1},\ \underbrace{1,1,\ldots,1}_{n}]$$

for input tracking such that there are m+1 zeros on the left in the window $\rho_u$, and only m zeros on the left in the window $\rho_y$, so that the number of elements in the window $\sigma_u$ is less than in the window $\sigma_y$.

6. An improved method as defined in claim 5 for input tracking wherein an estimate of the transmitted word $U_s$ is computed at the receiver of a communication channel as $$U_s = -H_s^I(A_s Y_s(k-1) - Y_s(k))$$

where $H_s^I$ denotes the Moore-Penrose inverse of $H_s$.

* * * * *